Patented May 26, 1925.

1,538,934

UNITED STATES PATENT OFFICE.

LEON W. GELLER, OF HAMBURG, NEW YORK, ASSIGNOR TO NATIONAL ANILINE & CHEMICAL CO. INC., OF NEW YORK, N. Y., A CORPORATION OF NEW YORK.

DISAZO DYES CONTAINING A DIPHENYLUREA NUCLEUS.

No Drawing.   Application filed April 28, 1924.   Serial No. 709,686.

*To all whom it may concern:*

Be it known that I, LEON W. GELLER, a citizen of Rumania, residing at Hamburg, in the county of Erie, State of New York, have invented certain new and useful Improvements in Disazo Dyes Containing a Diphenylurea Nucleus; and I do hereby declare the following to be a full, clear, and exact description of the invention, such as will enable others skilled in the art to which it appertains to make and use the same.

This invention relates to the manufacture and production of new azo dyes which are of value for dyeing unmordanted cotton. They also dye wool, silk and other fibres. The dyed fabrics, or other material, dyed with the new dyestuffs also form a part of the present invention.

The new dyestuffs can be obtained by converting into a urea compound the aminoazo dyes obtainable by combining one mol of diazotized 3-amino-4-methylbenzene-1-sulfonic acid with one mol of 4-alkoxy-3-amino-1-methylbenzene, e. g., 4-methoxy-3-amino-1-methylbenzene, 4-ethoxy-3-amino-1-methylbenzene, etc. The urea compound is produced in the usual way by treating the aminoazo dyes thus obtainable, said aminoazo compounds being hereinafter denoted and referred to as 2.2'-dimethyl-5-alkoxy-4-aminoazobenzene-5'-sulphonic acid, with phosgene in the presence of substances adapted to absorb hydrochloric acid such as, for instance, sodium carbonate.

The following specific example will further illustrate the invention, but it is understood that the invention is not limited thereto. The parts are by weight.

Example: 187 parts (one mol) of 3-amino-4-methylbenzene-1-sulfonic acid are suspended in about 1500 parts water containing abut 235 parts hydrochloric acid (20° Bé.) and 500 parts of ice, and are diazotized in the usual manner with the aid of about 70 parts sodium nitrite previously dissolved in about 250 parts water. To the cold diazo solution thus obtained, and maintained at a temperature of 0° to 5° C., there is added, while stirring, a cold solution of 137 parts (one mol) of 4-methoxy-3-amino-1-methylbenzene dissolved in about 3000 parts water and 136 parts hydrochloric acid (20° Bé.). The resulting mixture is then neutralized by the addition of sodium carbonate, and about 15 to 20 parts of sodium acetate subsequently added. The mixture is stirred until the combination is completed. When the combination is complete, the aminoazo compound is precipitated by acidifying the solution by the addition of hydrochloric acid and the precipitate isolated by filtration or other suitable means.

The aminoazo compound thus obtained, and which is denoted and hereinafter referred to as 2.2'-dimethyl-5-methoxy-4-aminoazobenzene-5'-sulfonic acid, is dissolved in about 25,000 parts water containing about 170 parts of sodium carbonate, and a current of phosgene is slowly introduced at ordinary temperature into the well stirred solution until the aminoazo compound is converted into the urea compound. The solution is kept alkaline throughout the reaction by the further addition, if necessary, of sodium carbonate. The reaction is finished when a test sample of the solution acidified with hydrochloric acid produces only a faint pink color when spotted on white filter-paper. When the reaction is complete, the dyestuff is salted out, isolated, pressed and dried.

The new dyestuff thus obtained, in the form of its sodium salt, has most probably the following formula:

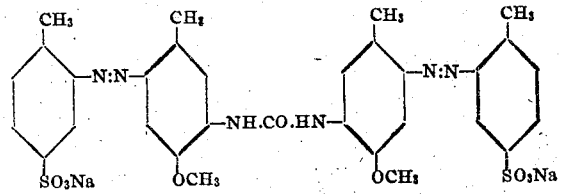

and in the dry and powdered state is a yellowish brown powder soluble in water with a yellow color, sparingly soluble in alcohol, and soluble in concentrated sulfuric acid with a dark bluish red color which on addition of ice produces a reddish brown precipitate. Upon reduction with stannous chloride and hydrochloric acid it yields 3- amino-4-methylbenzene sulfonic acid, 2.2'-dimethoxy-4.4'-diamino-5.5'-dimethyl diphenyl urea which by hydrolysis may be further decomposed into carbonic acid and 2.5-diamino-4-methoxytoluene. It dyes unmordanted cotton from a neutral bath yielding yellow shades of excellent fastness to washing and to light and which are capable of being discharged to a white by discharging agents such as sodium hydrosulfite.

Analogous dyestuffs possessing similar qualities are produced by treating 2.2'-dimethyl-5-ethoxy-4-amino-azobenzene-5'-sulfonic acid in a similar manner with phosgene.

In the specification and claims it will be understood that the term "alkoxy" denotes and includes the alkyl derivatives of a hydroxyl group, such as —$OCH_3$ (methoxy), $OC_2H_5$ (ethoxy), etc.

I claim:

1. As new products, the azo dyestuffs having in the shape of their sodium salts the following probable formula:

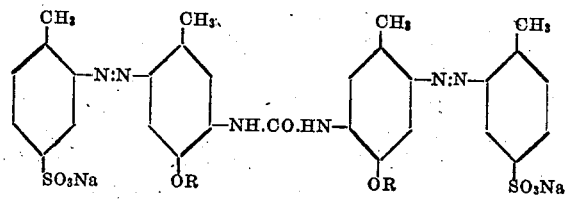

where R denotes an alkyl group, such as $CH_3$, $C_2H_5$, etc., being ureas of aminazo compounds obtainable by coupling diazotized 3-amino-4-methylbenzene-1-sulfonic acid into 4-alkoxy-3-amino-1-methylbenzene, yielding upon reduction with stanous chloride and hydrochloric acid, 3-amino-4-methylbenzene sulfonic acid and 2.2'-dialkoxy-4.4'-diamino-5.5'-dimethyldiphenyl urea which upon hydrolysis is further decomposed into 2.5-diamino-4-alkoxytoluene and carbonic acid; said azo dyestuffs in the shape of their dry and pulverized sodium salts being yellowish brown powders soluble in water with a yellow color, and soluble in concentrated sulfuric acid with a bluish red color which on dilution with ice produce a reddish brown precipitate; and dyeing unmordanted cotton yellow shades which are capable of being discharged to a white by the action of sodium hydrosulfite.

2. As a new product, the azo dyestuff having in the shape of its sodium salt the following probable formula:

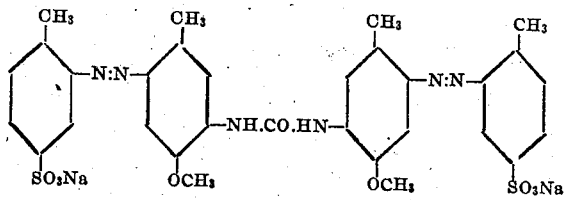

and obtainable by treating 2.2'-dimethyl-5-methoxy-4-aminoazobenzene-5'-sulfonic acid in the presence of sodium carbonate with phosgene, said azo dyestuff in the shape of its dry and pulverized sodium salt being a yellowish brown powder soluble in water with a yellow color and soluble in concentrated sulfuric acid with a bluish red color; yielding upon reduction with stannous chloride and hydrochloric acid, 3-amino-4-methylbenzene sulfonic acid and 2.2'-dimethoxy-4.4'-diamino-5.5'-dimethyldiphenyl urea which may be further decomposed into 2.5-diamino-4-methoxytoluene and carbonic acid; and said dyestuff dyeing unmordanted cotton yellow shades which are capable of being discharged to a white by the action of sodium hydrosulfite.

3. Materials dyed with the dyestuffs of claim 1.

4. Materials dyed with the dyestuff of claim 2.

In testimony whereof I affix my signature.

LEON W. GELLER.